Patented May 5, 1931

1,803,906

UNITED STATES PATENT OFFICE

WILHELM KRIEGER AND RUDOLF ZAHN, OF WIESBADEN-BIEBRICH, GERMANY, ASSIGNORS TO KALLE & CO., AKTIENGESELLSCHAFT, OF WIESBADEN-BIEBRICH, GERMANY, A CORPORATION OF GERMANY

DIAZO-TYPES STABILIZED WITH A DERIVATIVE OF THIOCARBONIC ACID AND A PROCESS OF PREPARING THEM

No Drawing. Application filed February 6, 1929, Serial No. 338,025, and in Germany February 16, 1928.

The present invention relates to diazotypes stabilized with a derivative of thiocarbonic acid and a process of preparing them.

Various processes are already known for preparing light-sensitive layers by using for this purpose a diazo-compound. There have been incorporated not only diazo compounds alone but also diazo compounds together with azo dyestuff components into the various materials intended to be made light-sensitive, such as for instance, paper, films or textile goods.

Light-sensitive layers which contain besides the diazo compound an azo component, have the advantage that the mere action of alkaline gases, such as for instance ammonia, suffices to produce the picture (compare German Patent No. 386,433 of October 7, 1921, in the name of Kalle & Co. Aktiengesellschaft and U. S. Patent No. 1,628,279 of May 10, 1927, in the name of Maximilian Paul Schmidt and Wilhelm Krieger). According to the particular diazo- and azo-components used, there are obtained copies of a great variety of tones and properties. It may happen, for instance that when the ammonia gas is caused to act for a considerable time, the ground of the pictures becomes more or less yellow or that in some rare cases the fastness to light of the pictures is not quite satisfactory.

We have now found that the said drawbacks can be avoided if sulfur compounds are incorporated into the light-sensitive layer. These additions may either be applied on a support together with the light-sensitive substance or they may be incorporated during the development into the light-sensitive layer. Suitable additions are, above all, compounds of the thiocarbonic acids, such as for instance thiourea, thiosinamine, thiocarbamic acid and the derivatives thereof, furthermore thioglycolic acids or the like. Colloidal sulfur, too, produces already the desired effect. Sulfur compounds which already react by themselves with diazo compounds and convert them into compounds capable of being coupled cannot, of course, be used. Moreover, there may be added to the light-sensitive layer besides sulfur compounds all substances which can be advantageously used in diazo-types, for the purpose in question, such as for instance acids, metallic salts, colloidal bodies, such as gelatine, dextrine and other substances which improve the absorbing power of the support for the solution of the light-sensitive materials.

The following examples illustrate the invention, but they are not intended to limit it thereto, the parts being by weight:

1. 15 parts of 2-1-diazohydroxynaphthalene-4-sulfonic acid, 3 parts of phloroglucine, 20 parts of titanammoniumfluoride and 50 parts of thiourea are dissolved in 1000 parts by volume of water and the solution is applied upon paper, film, or the like. After exposure under a positive, development in a gaseous alkali and, if required, a short after-treatment in a moist warm atmosphere, there are obtained black copies which possess a much better fastness to light than those which have been prepared without the addition of thiourea.

2. 13 parts of the double salt of zinc chloride of the diazo-compound and of 2-amino-5-ethylamino-1-toluene, 2.5 parts of phloroglucine, 60 parts of boric acid, 50 parts of tartaric acid, 50 parts of aluminium sulfate and 30 parts of thiourea are dissolved in 1000 parts by volume of water. If this solution is applied upon paper or the like, there are obtained, after exposure and development, black copies whose white parts do not become yellow even if the copies have remained in ammonia for a long time and which keep much better, even if exposed for a long time to day-light, than copies prepared with layers which have been made without using thiourea.

3. 13 parts of the double salt of zinc chloride of the diazo compound of 2-amino-5-ethylamino-1-toluene, 1.6 parts of phloroglucine, 1 part of resorcin are added to a solution prepared from 120 parts of borax, 100 parts of tartaric acid, 50 parts of aluminium sulfate, 20 parts of thiourea and 20 parts of dextrine; whereupon said solution is applied, as usual on or in a support, for instance paper or film. By means of this solution there are obtained black copies possessing properties similar to those of the copies described in Example 2.

4. 25 parts of the double salt of zinc chloride of the diazo compound of 5-amino-2-ethylamino-1-toluene, 5 parts of resorcin, 60 parts of tartaric acid, 25 parts of citric acid, 50 parts of aluminium sulfate and 40 parts of thiourea are dissolved in 1000 parts by volume of water and applied on paper or the like. After exposure to light and development, there are obtained brown copies whose white parts do not become yellow.

5. 12 parts of the diazo compound of para-amidodiphenylamine, 16 parts of 2:hydroxy-napthalene-3:6-disulfonic acid R, 30 parts of 1:3:6-napthalenetrisulfonic acid, 30 parts of tartaric acid, 30 parts of aluminium sulfate, 30 parts of thiourea and 10 parts of thiosinamine are dissolved in 1000 parts by volume of water and the solution is applied on paper or the like. After exposure to light and development there are obtained blue copies which as regards ground and fastness of the coloring matter, possess considerably better properties—even after they have remained for a long time in ammonia and have been exposed to day-light for a long time,—than copies prepared with layers which are made without using a sulfurous compound.

We claim:

1. The process of stabilizing diazo-types which consists in adding to the light-sensitive layer a derivative of thiocarbonic acid.

2. The process of stabilizing diazo-types which consists in adding to the light-sensitive layer a compound of the following constitution:

wherein X stands for $NH_2$ and may be substituted or not.

3. The process of stabilizing diazo-types which consists in adding to the light-sensitive layer a compound of the following constitution:

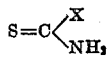

wherein X stands for $NH_2$ or NH. alkyl.

4. The process of stabilizing diazo-types which consists in adding to the light-sensitive layer a compound of the following constitution:

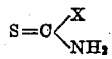

wherein X stands for $NH_2$ or $NH.C_3H_5$.

5. The process of stabilizing diazo-types which consists in adding thiourea to the light-sensitive layer.

6. As new products, diazo-types containing a compound of the following constitution:

wherein X stands for $NH_2$ and may be substituted or not, being of a great fastness to light.

7. As new products, diazo-types containing a compound of the following constitution:

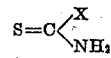

wherein X stands for $NH_2$ or NH. alkyl, being of a great fastness to light.

8. As new products, diazo-types containing a compound of the following constitution:

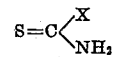

wherein X stands for $NH_2$ or $NH.C_3H_5$, being of a great fastness to light.

9. As new products, diazo-types containing thiourea, being of a great fastness to light.

In testimony whereof, we affix our signatures.

WILHELM KRIEGER.
RUDOLF ZAHN.